United States Patent [19]
Vasiliev et al.

[11] 4,240,141
[45] Dec. 16, 1980

[54] VIBRATION MOTOR

[76] Inventors: Petr E. Vasiliev, ulitsa Ugnyagyasju, 9, kv. 17, Vilnjus; Vladimir S. Dvornin, derevnya Pagirai, 8, kv. 13, Vilnjussky raion; Alexandr V. Kondratiev, prospekt Kosmonavtov, 43, kv. 72; Vladimir F. Kravchenko, ulitsa Venuolisa, 4, kv. 12, both of Vilnjus, all of U.S.S.R.

[21] Appl. No.: 34,016

[22] Filed: Apr. 27, 1979

[51] Int. Cl.$^3$ ............................................. H02K 33/00
[52] U.S. Cl. ................................. 318/114; 318/128; 318/138; 318/118; 73/664; 248/638; 274/1 E
[58] Field of Search ............... 318/318, 314, 254, 138, 318/118, 114, 128; 73/664; 248/550, 638; 188/1 B; 274/1 E

[56] References Cited
U.S. PATENT DOCUMENTS

| | | | |
|---|---|---|---|
| 2,964,272 | 12/1960 | Olson | 318/118 |
| 3,584,274 | 6/1971 | Dimitrios et al. | 318/138 |
| 3,643,140 | 2/1972 | Allison | 318/138 |
| 3,786,288 | 1/1974 | Joannoy | 274/1 E |
| 3,922,590 | 11/1975 | Warren et al. | 318/254 |
| 3,988,024 | 10/1976 | Watanabe et al. | 274/1 E |

*Primary Examiner*—David Smith, Jr.
*Attorney, Agent, or Firm*—Steinberg and Raskin

[57] ABSTRACT

The vibration motor comprises a concentrator of torsional vibrations, whose end face is in close contact with a rotor, and a piezoelectric cell unit adjoining the concentrator of torsional vibrations. Besides, the vibration motor is provided with a magnetic field source arranged under the rotor at the side of the concentrator of torsional vibrations and having a power sufficient to hold the rotor firmly against the concentrator end face, and with magnetic circuit. One part of the latter is movable, being fashioned as a disk with circumferentially spaced slots and rigidly connected to the rotor. The other part of the magnetic circuit separated from the first one by an air gap is stationary. It surrounds the magnetic field source and has peripheral slots identical to those of the movable disk and arranged opposite to them. The magnetic field source and the magnetic circuit form a rotor speed pickup connected with the piezoelectric cell unit through a frequency detector, a d-c power supply source and a high-frequency oscillator connected to each other in series.

4 Claims, 4 Drawing Figures

VIBRATION MOTOR

FIELD OF APPLICATION

The present invention relates to electric motors and relates more particularly to vibration motors intended for use in high-fidelity sound-recording and -reproducing devices.

BACKGROUND OF THE INVENTION

The problem of stabilizing the rotor rotational speed characteristic for such vibration motors is settled in certain well-known designs by using a speed stabilization circuit.

Known in the art, for example, is a vibration motor with a side-driven rotor provided with a number of equispaced holes equidistant from the center. Pressed against the side surface of the rotor is a concentrator of longitudinal vibrations adjoining working, shielding and feed-back piezoelectric cells. The working piezoelectric cell is connected with the output of a high frequency oscillator, whose inputs are connected one to an adjustable d-c power supply source and the other to a frequency separator; the shielding piezoelectric cell electrode is grounded; the feed-back piezoelectric electrode is connected with the said d-c power supply source via a frequency separator and a frequency detector.

Such a vibration motor operates in the following way.

Upon excitation of the working piezoelectric cell mechanical vibrations emerge in the cell. The frequency separator receives high-frequency oscillations of the piezoelectric cell in a form amplitude-modulated by a low-frequency signal generated due to periodic variation of the load imposed to the concentrator. The high-frequency oscillations are supplied to the working piezoelectric cell. The low-frequency oscillations are fed to the frequency detector which converts any change in the oscillation frequency into a voltage change. The voltage change is applied to the regulating element of the d-c power supply source to obtain an output voltage proportional to the rotor speed change.

Such a vibration motor is distinguished by a high stability of the rotor speed, but its power is comparatively low. Also known in the art is a vibration motor comprising a concentrator of torsional vibrations and a rotor held firm against the end face of the concentrator and provided with marks equally spaced along a circumference and intended for operation in conjunction with a rotor speed pickup. The latter is connected with a piezoelectric cell unit, built into the concentrator of torsional vibrations, via a frequency detector, a d-c power supply source and a high-frequency electric oscillator connected to each other in series.

Provision of a greater contact area between the concentrator and the rotor makes it possible to obtain a higher torque on the shaft of such a vibration motor. But in such vibration motors it is impossible to make use of a prior art rotor with holes to periodically vary the load imposed to the concentrator, because the concentrator driving stage is fashioned as a sleeve in distinction to a single rod-like configuration peculiar to the prototype.

It is a common practice to make use of a photoelectric or magnetic-flux gate transmitter as a rotor speed pickup in the vibration motors of this kind. Such transmitters are expensive and not simple in design. Moreover, they complicate the vibration motor construction, which is undesirable for use of such complicated vibration motors in electric playback devices particularly.

SUMMARY OF THE INVENTION

It is an object of the present invention to simplify the means of stabilization of the vibration motor rotational speed, maintaining a sufficiently high output power.

Another object of the present invention is to make simpler the construction of the vibration motor itself.

The invention resides in that in a vibration motor comprising a concentrator of torsional vibrations whose end face is in close contact with a rotor provided with marks equispaced along a circumference and intended for operation in conjunction with a rotor speed pickup connected with a unit of piezoelectric cells adjoining the concentrator of torsional vibrations, via a frequency detector, a d-c power supply source and a high-frequency electric oscillator put in series, according to the invention, the rotor speed pickup is made in the form of a magnetic system comprising a magnetic field source, arranged under the rotor at the side of the concentrator of torsional vibrations and having a power sufficient to hold the rotor firmly against the concentrator end face, and an open magnetic circuit, one part of which is movable, rigidly attached to the rotor and fashioned as a disk with circumferentially spaced slots serving as rotor marks, and the other part separated from the first one by an air gap is stationary, encloses the magnetic field source and is provided with peripheral slots identical to those of the movable disk and arranged opposite to them.

Use can be made of a ring-shaped permanent magnet enclosing the concentrator as a magnetic field source.

The magnetic field source can also be represented by an electromagnet whose coil form encircles the concentrator.

In the latter case it is expedient to provide the coil form with two windings and connect one of the windings to an adjustable d-c power supply source and the other winding to a frequency detector.

A vibration motor constructed in accordance with the present invention is characterized by a high output power and a high degree of rotor speed stability. Moreover, the construction of the vibration motor is markedly simplified owing to a structural combination of the means of discrimination of the signal proportional to the rotor speed and the means of holding down the rotor against the concentrator end face. The control of the vibration motor rotational speed is made easier and wider in range both by way of acting on the amplitude of oscillations and by controlling the rotor hold-down force through the utilization of a single magnetic system.

BRIEF DESCRIPTION OF DRAWINGS

Given below is a detailed description of exemplary embodiments of the present invention, in which reference will be made to the accompanying drawings, wherein according to the invention.

DETAILED DESCRIPTION OF PREFERRED EMBODIMENTS

Figure 1:
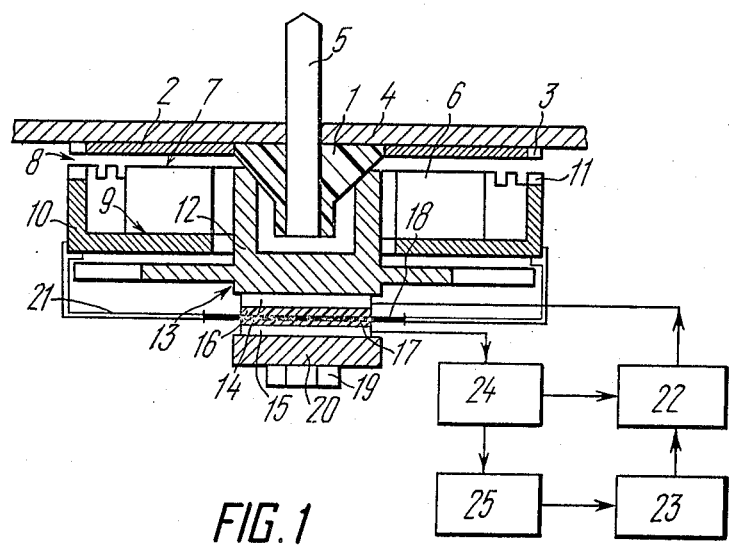
FIG. 1 shows a vibration motor with a magnetic system based on a permanent magnet, longitudinal elevation.

The vibration motor comprises a rotor 1 (FIG. 1) carrying a movable part 2 of the magnetic circuit, which is made in the form of a disk with slots 3 equally spaced along a circumference and serving as marks of the rotor 1. The rotor 1 and the part 2 of the magnetic circuit are secured to the disk 4 of an electric playback device, being fitted on a shaft 5. Located under the movable part 2 of the magnetic circuit is a magnetic field source—a ring-shaped permanent magnet 6. The upper end face 7 of the magnet 6 is separated from the part 2 of the magnetic circuit by a distance (gap) 8, the lower end face 9 thereof rests on the magnetic circuit stationary part 10, encircling the magnet 6. The power of the magnet 6 is sufficient to hold the rotor 1 firmly against the end face of the concentrator 13. The upper peripheral end face of the magnetic circuit part 10 is provided with equispaced slots 11 identical to the slots 3 of the magnetic circuit part 2 and arranged opposite to the slots 3.

Inserted through the central hole of the ring-shaped magnet 6 is the driving stage 12 of the concentrator 13 of torsional vibrations. The concentrator 13 adjoins the piezoelectric cell unit consisting of a working piezoelectric cell 14 and a feed-back piezoelectric cell 15. The piezoelectric cells 14 and 15 are insulated from each other by gaskets 16 and 17 separated by a thin attachment flange 18. The piezoelectric cells 14 and 15, gaskets 16 and 17 and attachment flange 18 are held tight against the concentrator 13 by a bolt 15 and a washer (cover disk) 20 to provide a reliable acoustic joint.

The end face of the driving stage 12 of the concentrator 13 makes contact with the rotor 1, for instance, through a tapered joint serving both driving and bearing functions, as shown in FIG. 1. It is obvious that vibration motors of other designs are possible with the shaft 5 installed on bearings.

The concentrator 13 (through the medium of the attachment flange 18) and the stationary part 10 of the magnetic circuit are rigidly secured within a vibration motor housing 21.

The working piezoelectric cell 14 is connected with the output of an adjustable high-frequency oscillator 22 whose one input is coupled to an adjustable d-c power supply source 23 and the other to a frequency separator 24.

The feed-back piezoelectric cell 15 is connected with the input of the said adjustable d-c power supply souce 23 via the frequency separator 24 and frequency detector 25, thereby forming the following closed circuit for stabilization of rotational speed of the rotor 1:
17→24→25→23→22→14.

Figure 2:
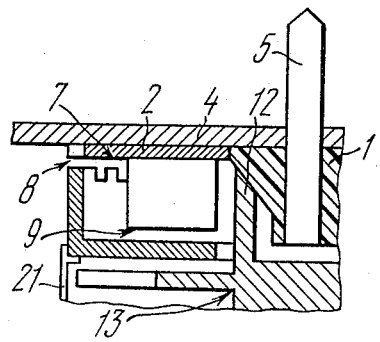
FIG. 2 is a fragmental view of a similar vibration motor in which the permanent magnet adjoins the rotor, longitudinal section.

It is worth while mentioning that the ring-shaped permanent magnet 6 can be arranged on the movable part 2 of the magnetic circuit, as shown in FIG. 2.

There are certain versions of vibration motors in which the force holding down the rotor 1 against the concentrator 13 must be controlled.

To provide the possibility of an electric control of the hold-down force, use can be made of an electromagnet as a magnetic field source.

Figure 3:
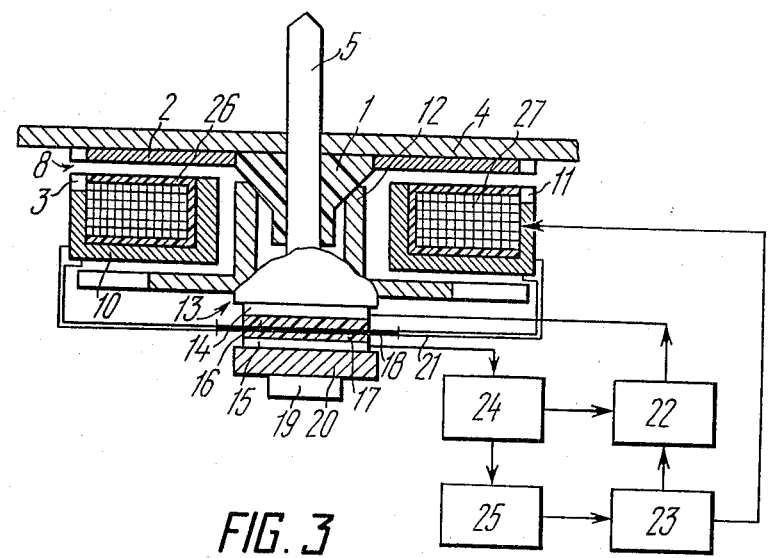
FIG. 3 shows a vibration motor with a magnetic system based on an electromagnet, longitudinal elevation.

The vibration motor shown in FIG. 3 features a coil form 26 with a winding 27 arranged inside the movable part 10 of the magnetic circuit and forming in conjunction with the movable part 2 thereof an integral plane tachogenerator. To make up a control circuit for speed regulation of the rotor 1 by varying the rotor-to-concentrator hold-down force, the winding 27 is connected with the output of the adjustable d-c power supply source 23. In all other respects the rotor speed stabilization circuit is similar to that shown in FIG. 1.

Figure 4:
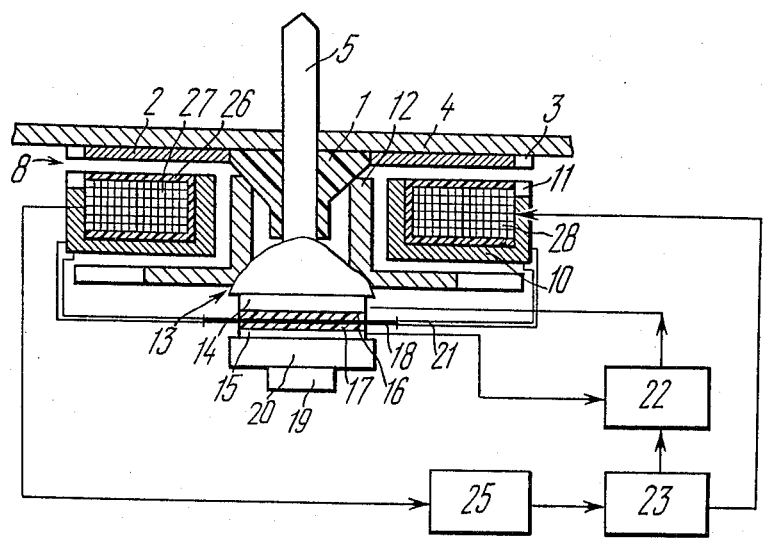
FIG. 4 shows another embodiment of the vibration motor provided with an additional electromagnetic coil, longitudinal elevation.

FIG. 4 shows another vibration motor version distinguished from that shown in FIG. 3 by an additional winding 28 in the coil form 26 to provide one more independent signal proportional to the rotational speed of the rotor 1.

In this case the feed-back piezoelectric cell 15 is connected directly to the high-frequency electric oscillator 22, while the input of the frequency detector 25 is coupled to the other (signalling) winding 28. The first (working) winding 27 is connected with the output of the adjustable d-c power supply source 23 in the manner shown in FIG. 3.

The vibration motor operates as follows.

The oscillator 22 produces high-frequency electric oscillations fed to the working piezoelectric cell 14. The piezoelectric cell 14 converts the electric oscillations into mechanical ones, thereby exciting the concentrator 13 of torsional vibrations. The concentrator 13 changes the longitudinal vibrations of the piezoelectric cell 14 to longitudinal-torsional ones which are concentrated in the driving zone of the stage 12 due to proper selection of the shape and size of the concentrator 13 to rotate the rotor 1. The magnetic circuit (parts 2 and 10) and the magnet 6 make up a magnetic system. The force holding down the rotor 1 against the concentrator 13 varies periodically (pulsates) during rotation of the rotor 1 due to the presence of the slots 3 and 11 made respectively in the parts 2 and 10 of the magnetic circuit, which results in a periodic variation of the load on the concentrator a high-Q oscillating system. The frequency separator 24 receives the high-frequency oscillations of the feed-back piezoelectric cell 15, which are amplitude-modulated due to the periodic variation of the load by a low-frequency signal whose frequency is proportional to the rotational speed of the rotor 1. The high-frequency oscillations discriminated by the frequency separator 24 are fed to the oscillator 22 to synchronize it and then supplied from the output of the oscillator 22 to the working piezoelectric cell 14. The piezoelectric cells 14 and 15 and units 24 and 22 make up a feed-back loop whose function is to maintain the natural frequency of oscillations of the concentrator 13.

The low-frequency oscillations are fed to the frequency detector 25 which converts any frequency change into a voltage change. The voltage change is applied to the regulating element of the d-c power supply source to produce an output voltage in accordance with the deviation of the rotational speed of the rotor 1.

The vibration motor presented in FIG. 2 operates in a similar way. The only difference consists in the fact that a smaller electromagnetic force is needed to hold down the rotor 1 against the concentrator 13 of this vibration motor.

The vibration motor version shown in FIG. 3 offers a possibility of electrically controlling the force holding down the rotor 1 against the concentrator 13 by means of the winding 27. This aim is achieved by making the following additional feed-back loop to control the rotor speed:

15→24→25→23→27. In the case under consideration any change in the rotational speed of the rotor 1 is counteracted (with a resultant compensation for the speed change) by an increase or decrease of the amplitude of electric oscillations at the output of the oscillator 22 and by a change of current flow through the winding 27.

The vibration motor shown in FIG. 4 also comprises a feed-back loop to maintain the natural frequency of oscillation of the oscillator 13: 15→22→14. As the rotor 1 revolves, the magnetic flux of the winding 27 changes; the periodic variation of the magnetic flux is sensed by the additional winding 28 (the magnetic flux variation frequency is proportional to the rotor rotational speed). The signals proportional to the rotor speed are fed to the frequency detector 25. In all other respects this version of the vibration motor functions identically with the operation of the vibration motor presented in FIG. 3.

What we claim is:

1. A vibration motor comprising: a concentrator of torsional vibrations; a rotor held firmly against the end face of said concentrator; a magnetic field source located under said rotor at the side of said concentrator and having a power sufficient to hold said rotor in tight contact with said concentrator a magnetic circuit enclosing said magnetic field source; a movable part of said magnetic circuit, rigidly attached to said rotor and fashioned as a disk; slots equispaced along a circumference of said disk; a stationary part of said magnetic circuit, separated from said movable part thereof by an air gap and encircling said magnetic field source; peripheral slots in said stationary part, which are identical to said disk slots and arranged opposite to them; said magnetic field source and magnetic circuit forming a rotational speed pickup for said rotor; a piezoelectric cell unit adjoining said concentrator; a high-frequency electric oscillator whose output is connected with said piezoelectric cell unit; and adjustable d-c power supply source whose output is connected with the input of said oscillator; a frequency detector whose output is connected with the input of said d-c power supply source and whose input is connected with the output of said rotor speed pickup.

2. A vibration motor according to claim 1, wherein a ring-shaped permanent magnet enclosing said concentrator is employed as said magnetic field source.

3. A vibration motor according to claim 1, wherein an electromagnet with its coil form surrounding said concentrator is utilized as said magnetic field source.

4. A vibration motor according to claim 3, wherein said electromagnet coil form comprises two windings: the first one is connected with said adjustable d-c power supply source, the other is connected with said frequency detector.

* * * * *